May 20, 1952  M. BITZER  2,597,059
WINDSHIELD CLEARING DEVICE
Filed April 13, 1946  2 SHEETS—SHEET 1
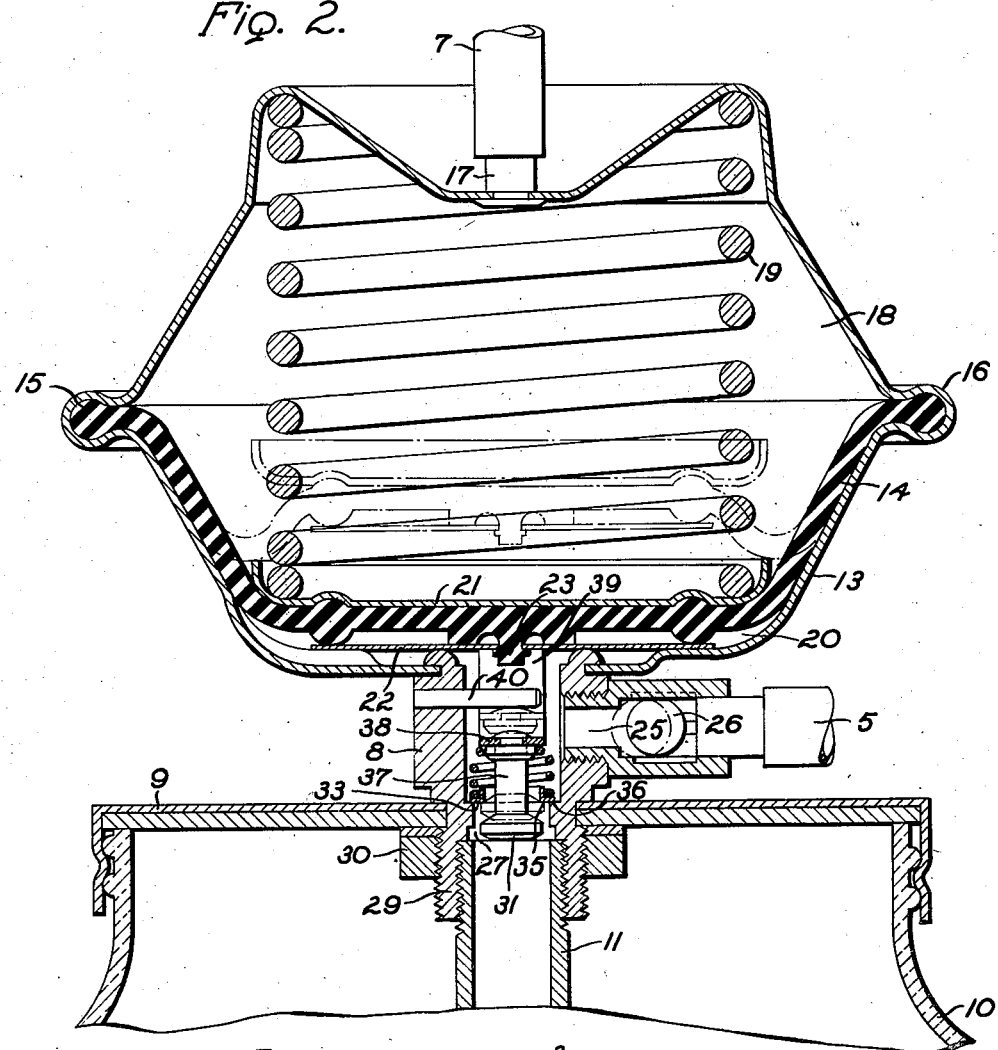
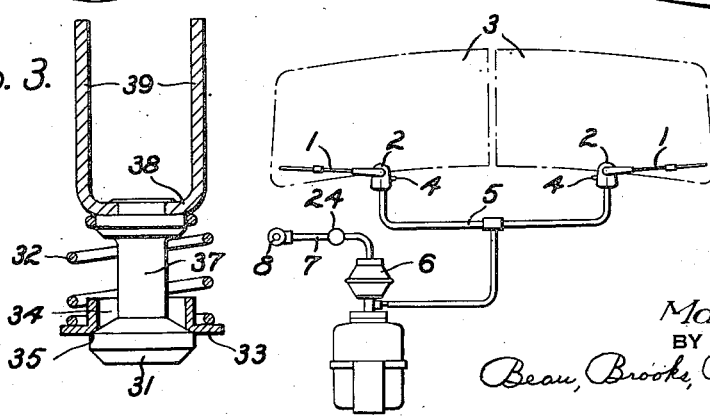
INVENTOR
Martin Bitzer
BY
Bean, Brooks, Buckley & Bean.
ATTORNEYS May 20, 1952  M. BITZER  2,597,059
WINDSHIELD CLEARING DEVICE
Filed April 13, 1946  2 SHEETS—SHEET 2
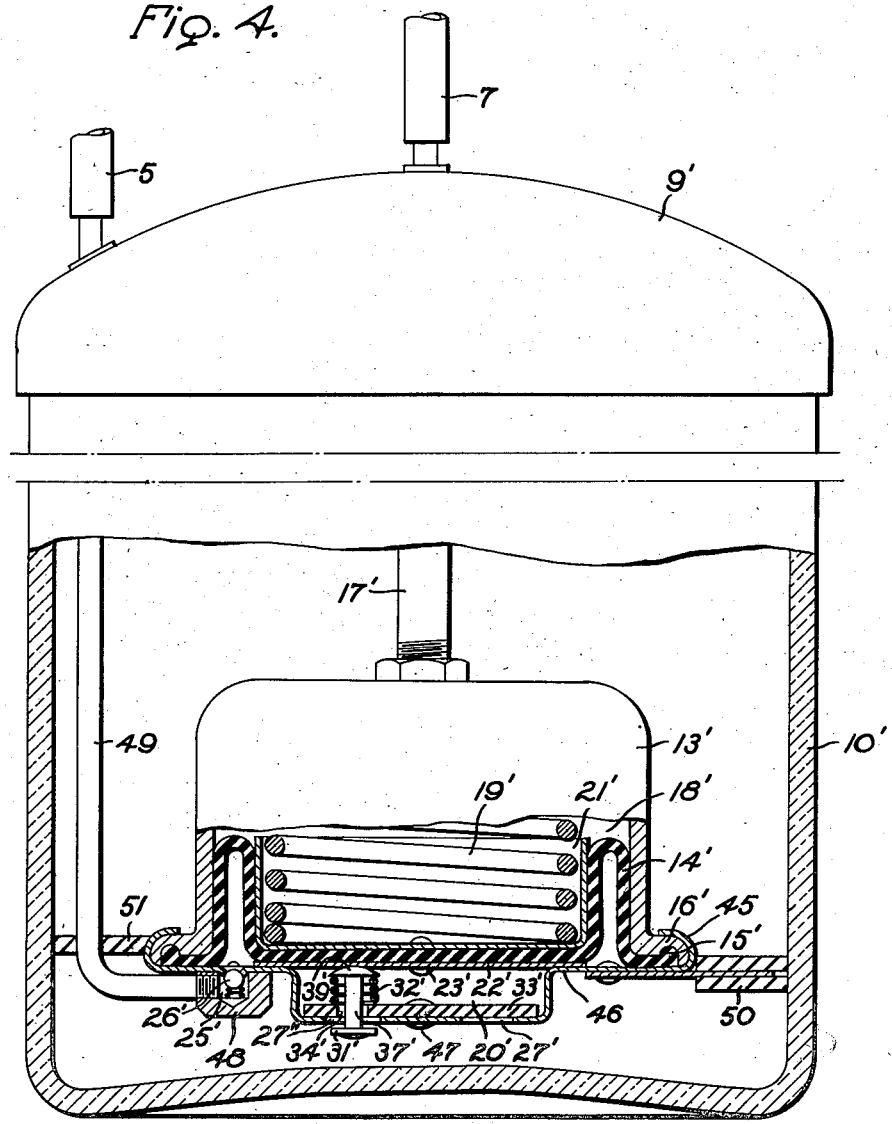
INVENTOR
Martin Bitzer
BY
Beau, Brooks, Buckley + Beau.
ATTORNEYS Patented May 20, 1952

2,597,059

UNITED STATES PATENT OFFICE 2,597,059

WINDSHIELD CLEARING DEVICE

Martin Bitzer, Kenmore, N. Y., assignor to Trico Products Corporation, Buffalo, N. Y.

Application April 13, 1946, Serial No. 661,931

8 Claims. (Cl. 299—56)

1

This invention relates to the automotive accessory field and particularly to a washer for washing the windshield of an automobile.

It has heretofore been proposed to discharge a spray or jet of water or other liquid onto the windshield for cooperating with the oscillatory windshield wiping squeegee in removing road film, dust, insects, and other vision-obscuring matter from the field of vision of the driver of the motor vehicle. In the practical adaptation of this washer a predetermined quantity of the liquid would be discharged by a spring backed fluid displacing member which would effect a steady stream or spray. As such pumping apparatus approached the end of its discharge stroke, the spray would lose its force and gradually dwindle away with the result that the final portion of the discharge would be lost for practical purposes.

The object of the present invention is to provide a windshield washer in which the liquid spray or jet will be delivered to the windshield in a uniform manner without waste and thereby conserve the supply of liquid.

A further object of the invention is to provide a windshield washer of this character wherein the spray discharging pump, after taking in a charge of liquid from a reservoir, will effectively discharge the volume in the form of a steady, uniform stream for a predetermined time interval and thereafter abruptly terminate the discharge and return the unused portion of the charge to the reservoir.

These and further objects will manifest themselves as the description progresses, reference being had to the accompanying drawings, wherein:

Fig. 1 is a diagrammatic view illustrating the application of the present invention to a windshield of a motor vehicle;

Fig. 2 is an enlarged sectional view through the pump and its supporting reservoir, the latter being depicted in fragment;

Fig. 3 is a detailed view of the venting or dumping valve;

Fig. 4 is an illustration of a modified pump submerged within the reservoir; and Fig. 5 is a fragmentary bottom plan view thereof.

Referring more particularly to the drawings, the numerals 1 designate the dual wipers mounted in brackets 2 to sweep over and wipe the windshield surface 3. Each bracket is shown provided with a spray nozzle or jet 4 connected by conduits 5 to the pump generally indicated at 6, the latter being in turn connected by a conduit 7 to a source of pressure or suction supply, such as the intake manifold of the motor vehicle power plant. Herein the conduit 7 is shown as branching off from the suction line 8 of the windshield cleaner system.

The pump is shown in Fig. 2 as being mounted upon the removable cover 9 of a liquid containing reservoir 10 and has an intake pipe 11 depending into the latter with its lower end submerged within the liquid content thereof. The pump comprises a body or casing 13 in which is arranged the fluid displacing member 14, the latter being herein depicted in the form of a diaphragm having its marginal bead 15 suitably anchored, as by the crimp 16 in the sheet metal casing wall. The upper portion of the pump casing is provided with a nipple or tube 17 through which the conduit 7 communicates with the upper chamber 18 above the diaphragm 14. A compression coil spring 19 is interposed between the top wall of the casing and the diaphragm normally to urge the latter downwardly to discharge the liquid from the lower pump chamber 20. The central portion of the diaphragm may be faced on opposite sides by reinforcing body plates 21 and 22, with the upper plate 21 being cupped or shaped to receive and support the lower end of the spring in position. The diaphragm, which is preferably of rubber may have a headed stud 23 passed through an aperture in the lower plate 22 to secure the latter in place while the upper plate 21 may be suitably interlocked with the diaphragm and held in place by the downward urge of the spring. By means of a normally closed valve 24 in the suction line 7 the source of communication may be connected to the upper chamber 18 to enable the pump intaking a charge or volume of water or other liquid from the reservoir 10 into the lower pump chamber 20 following which the valve 24 is again closed, in which closed position it vents the upper chamber 18 to the atmosphere so that the spring 19 may function to force the liquid from the wet chamber 20 out through the outlet port 25, past the outlet valve 26 and through the conduit 5 to the nozzles 4. This operation is well known and is shown in Patent No. 2,260,904. The inlet port 27, together with the outlet port 25 may be formed in an extension of the pump casing, the extension being in the form of a fitting 28 which has a threaded shank 29 engaged by a nut 30 to clamp the fitting to the reservoir cover 9, such shank being internally threaded to receive the upper end of the inlet pipe 11.

According to the present invention, means are provided for venting the pump chamber 20 as the diaphragm approaches the end of its delivery stroke. According to the illustrated embodiment, this is accomplished by opening a valve 31 which will dump or drain the remaining liquid from the chamber 20 back into the reservoir. Normally this valve is closed by a light coil spring 32 serving to hold the valve to its seat. Such valve and seat may be located in a suitable part of the pump for its liquid draining function. In the illustrated embodiment the inlet valve 33 is formed with a liquid draining or dumping port 34 therethrough, thereby providing a seat 35 for the dumping or drain valve 31. The inlet port 27 opens through a seat 36 to which the inlet valve 33 is urged by the reaction of spring 32. The dumping valve 31 is suspended by its shank 37 from a bracket 38 having a pair of upstanding arms 39 extending into the path of the downcoming diaphragm to be engaged and depressed thereby for unseating the drain valve 31. A pin 40 extends between the arms 39 to prevent accidental displacement of the combined valve unit 31, 33.

From the foregoing description it will be observed that the application of suction or low pressure to the upper side of the diaphragm will cause the pump to intake a volume of liquid and consequently unseat the inlet valve 33. During this operation the drain valve 31 will move with the inlet valve 33 as a unit so that the inlet valve unit is composite in construction, the extent of unseating movement of the unit being limited by the overhanging pin 40. Upon the discharge stroke of the pump, the downward urge of the spring on the diaphragm will cause the composite inlet valve unit to seat, whereupon the liquid will be discharged through the outlet port 25 and the connected nozzles 4. The issuing streams of liquid from the nozzles will be maintained at substantially a steady pressure throughout the stroke of the pump diaphragm and until such time that the diaphragm engages the arms 39 and depresses the drain valve to its open position whereupon the remaining liquid content in the chamber 20 will return to the underlying reservoir, while the check valve 26 will close against the escape of liquid from the nozzle conduits 5. Therefore, the delivered streams of liquid will be abruptly terminated to avoid waste which in prior devices have occurred as the pressure tapers off to an end.

Fig. 4 shows a modified embodiment wherein the pump is submerged within the container or reservoir 10'. In this embodiment the pump casing 13' is suspended by the suction pipe or tube 17' from the cover 9', the conduit 7 being attached to the upwardly protruding end of the pipe 17'. The casing 13' is of inverted, cup-shaped design and has a rim or seat 16' on which the marginal bead 15' of the diaphragm 14' is secured as by turning or crimping thereover the marginal flange 45 of the casing closure plate 46. This bottom closure plate for the casing is formed with an inlet port 27' normally closed by a valve 33' while the drain or dump valve 31' is urged to its closed position by the spring 32'. The valve 33' is in the form of a flexible disc secured at its center by a fastener 47 between the inlet port 27' and the drain valve 31'. Therefore, the marginal portion of the disc which valves the inlet port 27' will yield and move independently of the drain valve, which latter may seat upwardly against the valve 33' to close the drain port 34' therethrough. By this arrangement the adjacent portion of the valve 33' may move as a unit with the dumping valve to admit additional liquid through the auxiliary inlet port 27'' from the reservoir into the wet chamber 20'. Obviously the drain valve could be of greater expanse and seat over the auxiliary inlet port and against the underside of the closure plate 46, in which instant the auxiliary port 34' would not serve to admit liquid into the pump. The pump spring 19' seats within the cupped facing plate 21' on the diaphragm while underlying the diaphragm is the facing plate 22'. These two plates may be secured in place by suitable means such as a fastener 23'. Such type of fastener may, of course, be employed in the embodiment shown in Fig. 2 to secure the plates 21 and 22 together, if desired. The outlet port 25' leads from the wet chamber through a fitting 48 and tube 49, the latter extending upwardly through the cover 9' for being attached to the conduit 5 and also for cooperating with the pipe 17' in providing a suspending support for the pump.

In operation, upon connecting the dry chamber 18' to the source of low pressure the liquid content of the reservoir will be forced through the inlet ports 27' and 27'' to compress the spring 19'. When the suction communication is interrupted and the dry chamber is vented to the atmosphere by the valve 24, Fig. 1, the spring 19 will then function to depress the diaphragm and express the liquid from the wet chamber out through the tube 49 to the spray nozzles 4. As the diaphragm approaches the end of its delivery stroke, it will contact the head 39' on the upper end of the shank 37' to unseat the dumping valve 31' against the urge of its spring 32' thereby opening the wet chamber to the reservoir for dumping the pump of its liquid content. A check valve 26' arranged in the outlet port 25' will serve to retain the liquid in the outlet pipe 49 against return flow back into the reservoir.

The pump may be supported from the side walls of the reservoir 10' by spacing fingers 50 and 51.

From the foregoing it will be observed that the pump will deliver a steady stream of liquid onto the windshield from each nozzle 4 and when the charge of liquid has been practically spent or delivered, the streams will be abruptly cut off by reason of the venting of the wet chamber or the delivery passage therefrom to the reservoir so that the remainder of the liquid under pressure will be quickly discharged from the wet chamber. The drain or dumping valve actually constitutes a pressure relieving valve for relieving the pressure on the liquid at the nozzle. It is this pressure release that determines the issuance of the jet or spray of liquid from the nozzle.

While the foregoing description has been given in detail for ease of understanding, it is not intended thereby to limit the invention since the inventive principles involved are capable of assuming other physical embodiments without departing from the scope of the appended claims and the spirit of the present invention.

What is claimed is:

1. A window clearing system for motor vehicles, comprising a spray nozzle, a reservoir for the liquid, a pump connected to the nozzle and reservoir and having a fluid displacing member for acting under spring pressure to discharge the liquid through the nozzle, said pump having an inlet port with a valve therefor and also a pressure relieving port for discharging back into the reservoir, a second valve normally having a part extending into the path of the fluid displacing member for engagement thereby during its liquid expelling stroke to open such pressure relieving port for relieving the pressure on the liquid at the nozzle.

2. A window clearing system for motor vehicles, comprising a spray nozzle, a reservoir for the liquid, a pump connected to the nozzle and reservoir and having a fluid displacing member acting on one stroke to intake liquid from the reservoir and on the other stroke to discharge the liquid from the pump and through the nozzle, said pump having an inlet valve with a pressure relieving port therethrough, a valve for closing the pressure relieving port, and a spring urging the second valve to close the pressure relieving port, said second valve having a part engaged by the liquid displacing member during its liquid expelling stroke to interrupt the delivery of liquid to the nozzle.

3. A window clearing system for motor vehicles, comprising a spray nozzle, a reservoir for the liquid, a pump connected to the nozzle and reservoir and having a fluid displacing member acting on one stroke to intake liquid from the reservoir and on the other stroke to discharge the liquid from the pump and through the nozzle, said pump having an inlet valve with a pressure relieving port therethrough, a valve for closing the pressure relieving port, a spring reacting between the two valves to normally urge the second valve to its seat on the inlet valve, and means holding the combined valve unit in position, said second valve having a U-shaped part straddling said holding means and extending into the path of said fluid displacing member for engagement thereby to open the pressure relieving port when the fluid displacing member approaches the end of its liquid expelling stroke.

4. A window clearing system for motor vehicles, comprising a spray nozzle, a reservoir for the liquid, a pump connected to the nozzle and reservoir and having a fluid displacing member acting to deliver liquid from the reservoir through the nozzle, said pump having an inlet port, a flap valve closing the port and having a drain port therethrough, and a valve for closing the drain port, said drain valve being normally opened by the fluid displacing member at the end of its liquid expelling stroke.

5. A window clearing system for motor vehicles, comprising a spray nozzle, a reservoir for the liquid, a pump connected to the nozzle and reservoir and having a fluid displacing member acting to deliver liquid from the reservoir through the nozzle, said pump having an inlet port, a flap valve closing the port and having a drain port therethrough, a valve for closing the drain port, said drain valve being normally opened by the fluid displacing member at the end of its liquid expelling stroke, and means interposed between the pump and the nozzle for trapping liquid to the nozzle side thereof against drainage back into the reservoir.

6. A liquid spray system for the windshield of a motor vehicle, comprising a spray nozzle disposed to deliver a spray upwardly onto an associated windshield, a reservoir for the liquid, a pump connected to the nozzle and reservoir and having a fluid displacing member acting in a chamber of the pump to deliver liquid under pressure to the nozzle, said pump having a normally closed pressure relieving valve, means to operate said valve by the fluid displacing member before the end of each liquid expelling stroke to open the same for removing the expelling pressure on the liquid at the nozzle, and a valve acting to hold the liquid between the pump and the nozzle from draining back into the reservoir when said pressure relieving valve is operative.

7. A washer for the windshield of a motor vehicle, comprising a spray nozzle, a liquid containing reservoir, a pump having a chamber connected to the nozzle and reservoir and a fluid displacing member acting on one stroke to intake liquid into the chamber from the reservoir and on the other stroke to expel the liquid from the chamber through the nozzle, means acting automatically to impart said expelling stroke to the fluid displacing member, a valve, and means to operate said valve by the fluid displacing member before the end of each liquid expelling stroke to establish communication between the reservoir and the pump chamber for draining the chamber liquid content back into the reservoir thereby to abruptly terminate the nozzle ejected stream.

8. A window clearing system for motor vehicles, comprising a spray nozzle, a reservoir for the liquid, a pump connected to the nozzle and reservoir and having a fluid displacing member acting on one stroke to intake liquid from the reservoir and acting under spring pressure on the return stroke to discharge the liquid through the nozzle, said pump having an inlet valve operable for opening to admit liquid into a pump chamber, and a second valve normally closed but openable for returning liquid from the chamber to the reservoir, said second valve having a part engageable by the liquid displacing member during its spring return stroke.

MARTIN BITZER.

REFERENCES CITED

The following references are of record in the file of this patent:

UNITED STATES PATENTS

| Number | Name | Date |
|---|---|---|
| 1,264,554 | Peron | Apr. 30, 1918 |
| 1,489,348 | Hampton | Apr. 8, 1924 |
| 1,716,945 | Beede | June 11, 1929 |
| 2,012,218 | Burress | Aug. 20, 1935 |
| 2,142,056 | Horton | Dec. 27, 1938 |
| 2,153,519 | Horton | Apr. 4, 1939 |
| 2,260,904 | Horton | Oct. 28, 1941 |
| 2,430,545 | Wesley | Nov. 11, 1947 |